(12) United States Patent
O'Shell et al.

(10) Patent No.: US 9,430,514 B1
(45) Date of Patent: Aug. 30, 2016

(54) LOCKING METADATA ASSOCIATED WITH CATALOG ITEMS

(75) Inventors: Joy N. O'Shell, Seattle, WA (US); Lucas B. Dickey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 694 days.

(21) Appl. No.: 12/889,708

(22) Filed: Sep. 24, 2010

(51) Int. Cl.
*G06F 17/30* (2006.01)

(52) U.S. Cl.
CPC ............... *G06F 17/30362* (2013.01)

(58) Field of Classification Search
USPC ........................................................ 707/704
See application file for complete search history.

(56) References Cited

U.S. PATENT DOCUMENTS

| 7,418,706 B1 * | 8/2008 | Luo ................. G06F 17/3046 707/999.2 |
| 2006/0167878 A1 * | 7/2006 | Hartman ........................... 707/8 |
| 2009/0282043 A1 * | 11/2009 | Dharmavaram et al. ......... 707/8 |

OTHER PUBLICATIONS

Morita, XML Tutorial vol. 3: DTD Basics, Apr. 2007, Shoeisya, DB Magazine, pp. 1-9.*
Kroenke, Database processing: fundamentals, design, and implementation, 2000, Prentice-Hall, 7th Edition, pp. 297-299 and pp. 308-316.*
Kroenke, Database processing: fundamentals, design, and implementation, 2000, Prentice-Hall, 7$^{th}$ Edition, pp. 410, 419-420.*

* cited by examiner

*Primary Examiner* — Albert Phillips, III
(74) *Attorney, Agent, or Firm* — Thomas | Horstemeyer, LLP

(57) ABSTRACT

Disclosed are various embodiments for locking metadata associated with catalog items. An identifier of an item in the item catalog and update metadata associated with the item are received. Responsive to the receipt, it is determined whether a lock against modification is associated with the identified item. Responsive at least in part to the determination that the identified item is associated with a lock, the identified item is left unmodified in the item catalog rather than modifying the identified item in accordance with the update metadata.

20 Claims, 4 Drawing Sheets

LOCKING METADATA ASSOCIATED WITH CATALOG ITEMS

Electronic commerce systems provide items for sale through item catalogs. Sometimes operators of the electronic commerce system allow third party vendors to access the item catalog so that the vendors can provide updates to item information such as price. Although the electronic commence operator retains some degree of control over these updates, a mistake in the update data can, nonetheless, cause trouble for the electronic commerce operator.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to locking metadata associated with catalog items. Third party vendors provide update feeds for catalog items. These update feeds are ingested and processed by a system operated by the owner of the catalog, which may be an electronic commerce operator. In processing the update feed, the system determines whether an item in the update is currently locked against modification. If the item is currently locked, the system leaves the item in the catalog as is instead of applying the metadata in update to the item in the catalog. The vendor providing the update feed may be notified that the update has not been applied.

If the item is locked, the update may be queued for a later time. If the lock is no longer applicable at the later time (e.g., expired, disabled, removed, etc.), the update may be removed from the queue and modified in accordance with metadata in the stored update. In the following discussion, a general description of the system and its components is provided, followed by a discussion of the operation of the same.

Figure 1:
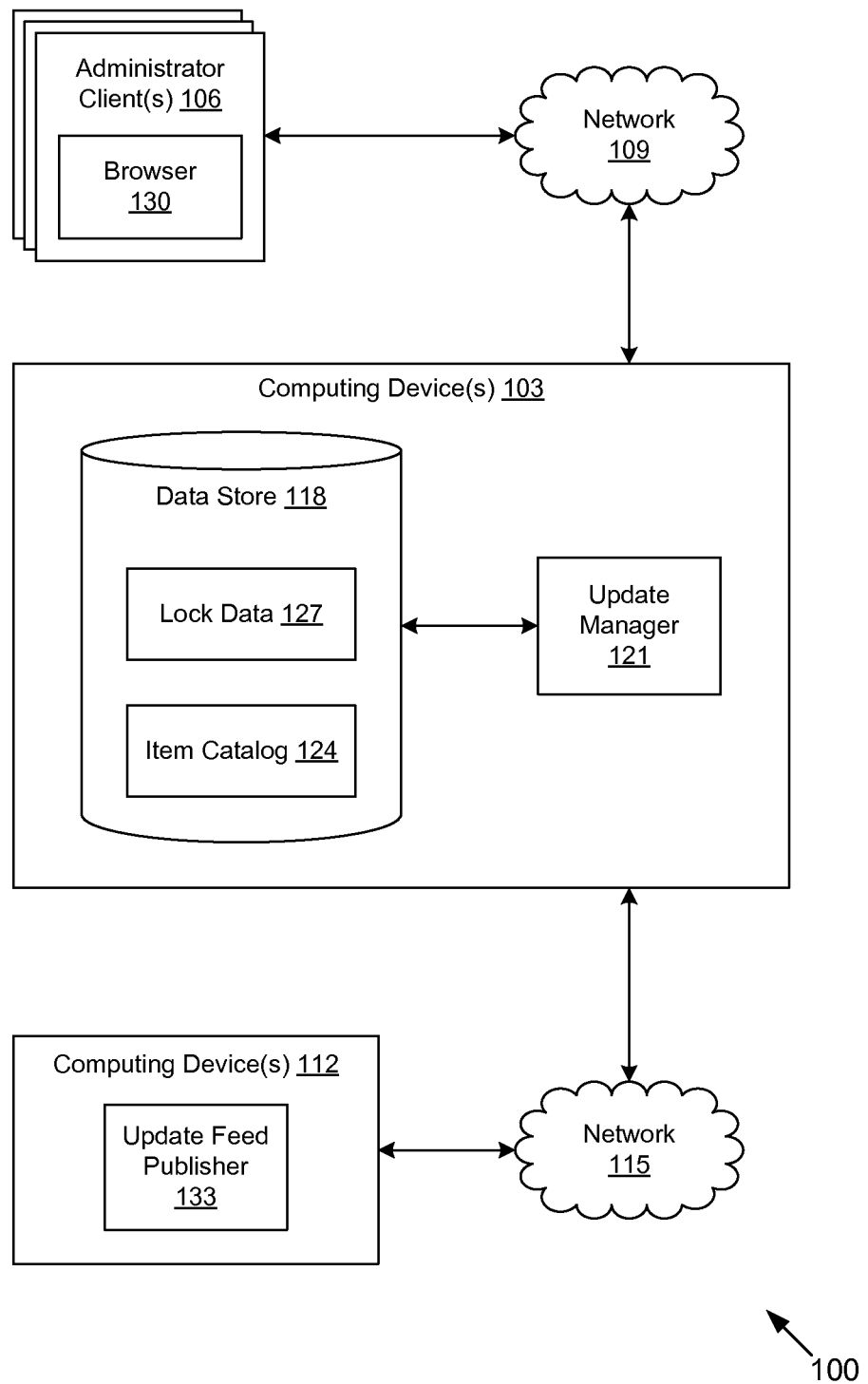
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more administrator clients 106 by way of a network 109. The computing device 103 is also in data communication with one or more computing devices 112 by way of a network 115. In various embodiments, the network 109 and the network 115 may be the same network or a different network. The networks 109, 115 include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements as described herein.

Various applications and/or other functionality may be executed in the computing device 103 according to various embodiments. Various data is stored in a data store 118 that is accessible to the computing device 103. The data store 118 may be representative of a plurality of data stores, as can be appreciated.

The components executed on the computing device 103, for example, include an update manager 121 and may also include other applications, services, processes, systems, engines, or functionality not discussed in detail herein. The update manager 121 is executed to apply updates to an item catalog 124.

The data stored in the data store 118 includes, for example, an item catalog 124, lock data 127, and potentially other data which is associated with the operation of the update manager 121. In some embodiments, the items in the item catalog 124 are products offered for sale, and in such embodiments, the computing device 103 may also include an electronic commerce application (not shown).

Turning now from the computing device 103 to the administrator client 106, the administrator client 106 is representative of a plurality of client devices that may be coupled to the network 115. The administrator client 106 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other devices with like capability.

The administrator client 106 may be configured to execute various applications such as a browser 130 and/or other applications. The browser 130 may be executed in an administrator client 106, for example, to access and render network pages, such as web pages, or other network content served up by the computing device 103 and/or other servers. The administrator client 106 may be configured to execute applications beyond browser 130 such as, for example, email applications, instant message applications, and/or other applications. The administrator client 106 may utilize web services or other types of services to interact with the update manager 121. These web services, for example, may be implemented via a variety of middleware frameworks, such as remote procedure calls, service-oriented architecture (SOA), representational state transfer (REST), and other frameworks.

Turning now from the administrator client 106 to the computing device 112, the computing device 112 may comprise, for example, a server computer or any other system providing computing capability. Alternatively, a plurality of computing devices 112 may be employed that are arranged, for example, in one or more server banks or computer banks or other arrangements. For example, a plurality of computing devices 112 together may comprise a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in various arrangements as described above.

Various applications and/or other functionality may be executed in the computing device 112 according to various embodiments. The components executed on the computing device 112, for example, include an update feed publisher 133. The update feed publisher 133 is executed to provide updates for the item catalog 124 stored in the computing device 103. The components executed on the computing device 112 may also include other applications, services, processes, systems, engines, or functionality not discussed in detail herein.

Next, a general description of the operation of the various components of the networked environment 100 is provided. To begin, the update manager 121 receives an update for the item catalog 124 from the update feed publisher 133. The update feed publisher 133 maybe operated by an third-party vendor which is external with respect to the electronic commerce operator. Modification to items in the item catalog 124 is controlled by a data structure referred to herein as a "lock." The update manager 121 uses the lock data 127 to determine whether a particular item within the item catalog 124 is locked against updates. If the item is locked, then the update manager 121 may ignore the update or may queue the update for later processing. If the item is not locked, the update manager 121 applies the data contained within the received update to the item catalog 124.

The update manager 121 provides an interface for operators to configure the locks. Using this interface, an operator can, for example, create a lock for a particular item identifier, enable and disable the lock for a particular item identifier, set the time and/or duration of a lock, and take other actions, some of which are described in more detail below.

Figure 2:
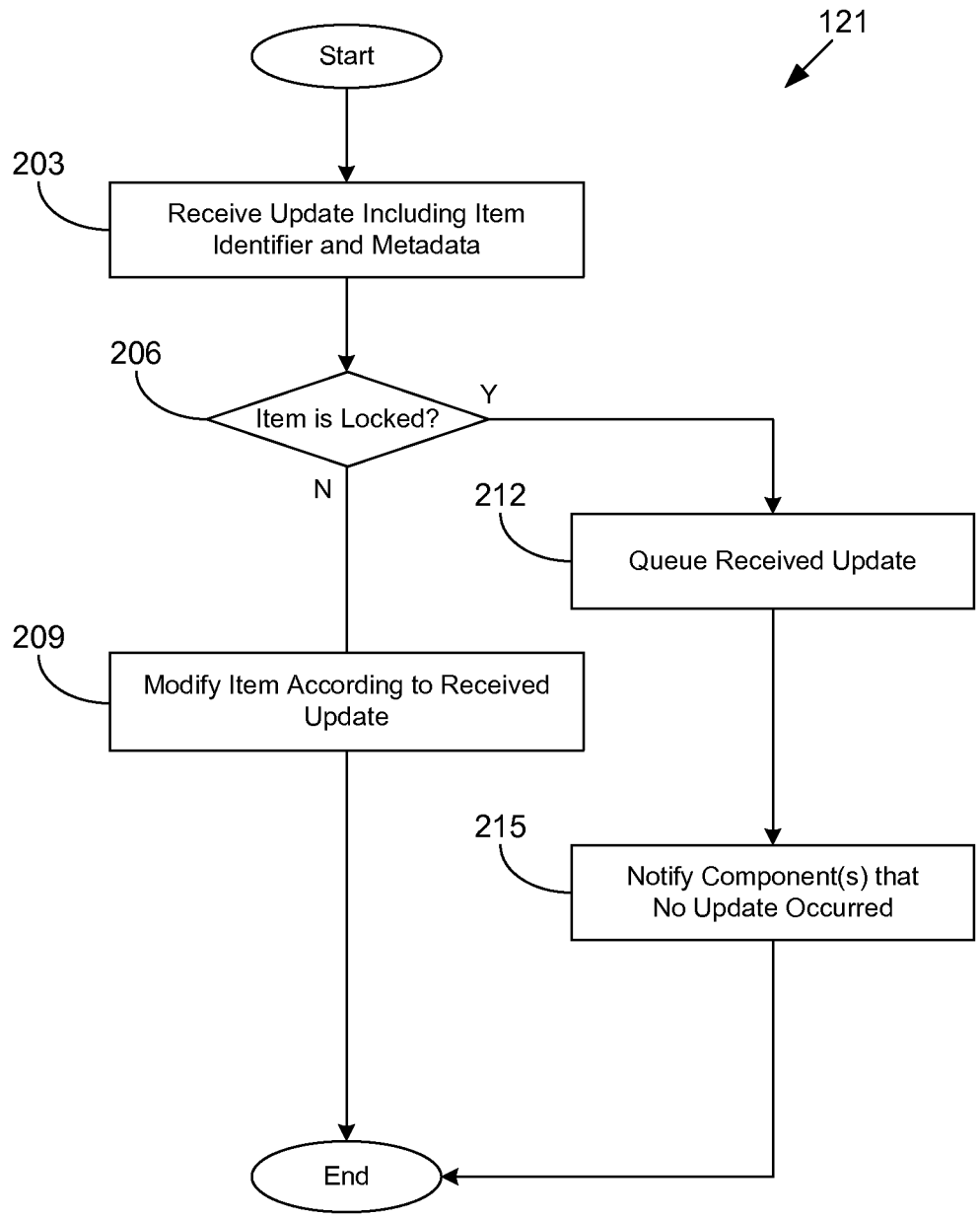
FIG. 2 is a flowchart illustrating one example of functionality implemented as portions of an update manager executed in a computing device in the networked environment of FIG. 1 according to various embodiments of the present disclosure.

Referring next to FIG. 2, shown is a flowchart that provides one example of the operation of a portion of the update manager 121 according to various embodiments. It is understood that the flowchart of FIG. 2 provides merely an example of the many different types of functional arrangements that may be employed to implement the operation of the portion of the update manager 121 as described herein. As an alternative, the flowchart of FIG. 2 may be viewed as depicting an example of steps of a method implemented in the computing device 103 (FIG. 1) according to one or more embodiments.

Beginning with box 203, the update manager 121 receives an update for the item catalog 124 from the update feed publisher 133. The received update may be in the form of an extensible markup language (XML) feed. The received update includes an item identifier which uniquely identifies an item within the item catalog 124. The received update also includes metadata for the identified item. Metadata may be in the form of attributes and values. Examples of metadata attributes for a music media item include title, artist, release date, price, etc. Examples of metadata attributes for a video media item include title, release date, price, etc. If the item is digital media, one of the metadata attributes may be content. For example, metadata for a movie may include the movie itself as well as information about the movie.

In box 206, the update manager 121 accesses the lock data 127 to determine whether the received update will be applied to the referenced item in the item catalog 124. In this regard, the update manager 121 looks for a lock which has the same item identifier as the received update. In some embodiments, the locks in the lock data 127 are indexed by item identifier.

If no matching lock is found in box 206, then the item is not locked, and the update manager 121 moves to box 209 in order to apply the update. In some embodiments, if a matching lock is found, box 206 performs a further check to determine if the lock is currently disabled. If the lock is present but disabled, the update manager 121 moves to box 209 to apply the update. In some embodiments, a lock may be enabled for a specific period (e.g., time range, date range, etc.)

If in box 206 the update manager 121 determines that the received update will not be applied, then the update manager 121 skips the update operation in box 209 and instead moves to box 212. The result is that the item referenced in the received update remains unmodified. In box 212, the update manager 121 queues the update for later application. The update manager 121 removes the queued update from the queue at a future time. If the lock has been disabled, expired, removed, etc. then the update to the item in the item catalog 124 is applied to the item catalog 124. The removal from the queue may be triggered by a timer, or may be triggered by a change in lock status.

After queuing the update, in box 215 the update manager 121 reports that no update has occurred. The components that are notified through this report may include, for example, a third-party vendor associated with the update feed publisher 133, an internal system operator associated with the item catalog, etc. Various forms of notifications may be used, for example, an email message to one or more addresses, a simple messaging service (SMS) text message, and any other suitable form of notification. After this notification, the process ends.

If in box 206 the update manager 121 determines that the update will be applied, in box 209 the update manager 121 modifies the item in the item catalog 124 in accordance with the received update. Such action may involve parsing the update to extract particular attributes to be modified, along with particular values to be written to the item catalog 124. After the update in box 209, the process ends.

It is not necessary that the update in box 209 be applied in real time, only that the update is committed. In contrast, the queuing of the update in box 212 does not commit to an update, but rather provides another opportunity to check again later for a change in lock conditions (e.g., has the lock been disabled, expired, removed, etc.)

The process shown in FIG. 2 is described in terms of an update which refers to a single item. However, the process can be modified to handle more than one item in an update, as will be appreciated. Also, although the example embodiment of FIG. 2 includes queuing in box 212 and notification in box 215, other embodiments omit one or both of these operations.

Figure 3:
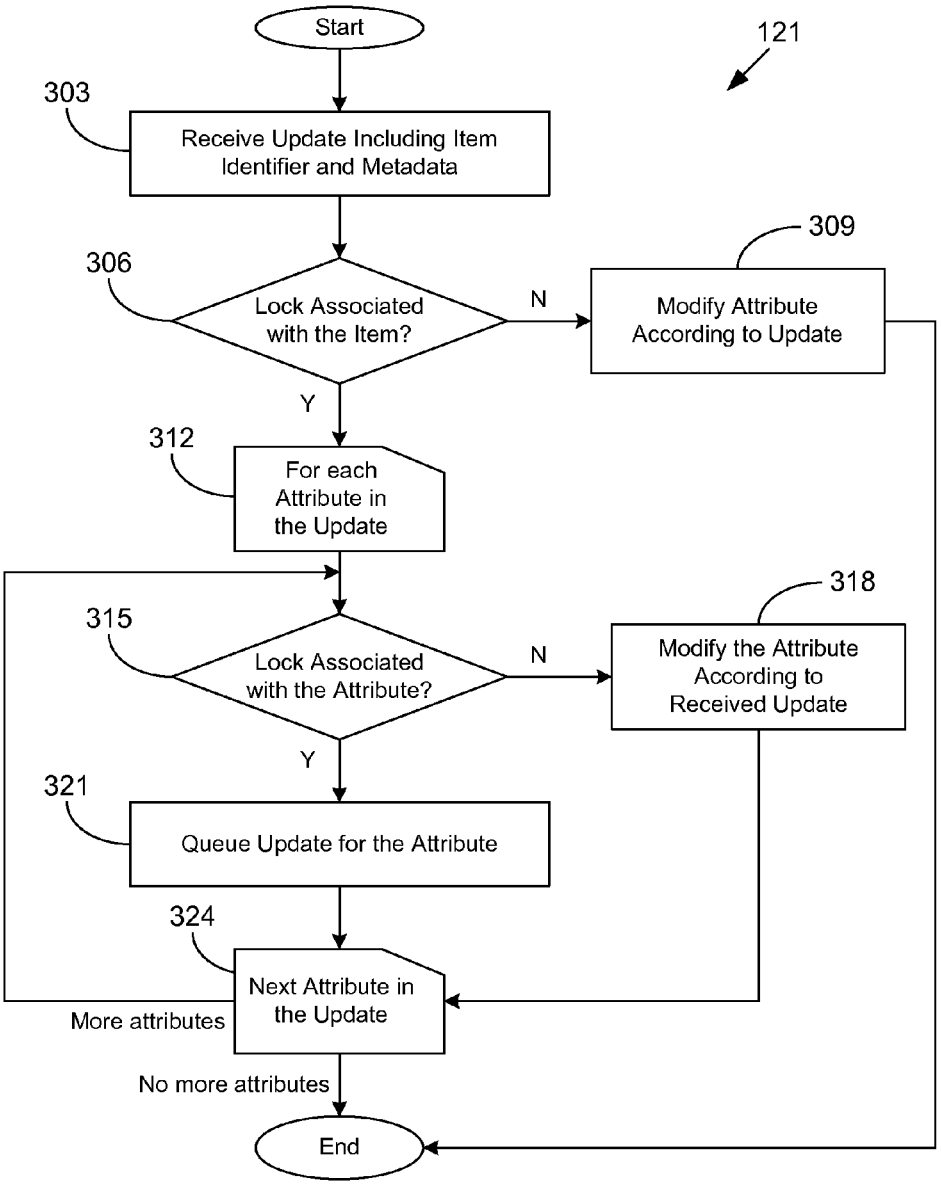
FIG. 3 is a flowchart illustrating another example of functionality implemented as portions of an update manager executed in a computing device in the networked environment of FIG. 1 according to various embodiments of the present disclosure.

With reference to FIG. 3, shown is a flowchart that provides another example of the operation of a portion of the update manager 121 according to various embodiments. It is understood that the flowchart of FIG. 3 provides merely an example of the many different types of functional arrangements that may be employed to implement the operation of the portion of the update manager 121 as described herein. As an alternative, the flowchart of FIG. 3 may be viewed as depicting an example of steps of a method implemented in the computing device 103 (FIG. 1) according to one or more embodiments.

Beginning with box 303, the update manager 121 receives an update for the item catalog 124 from the update feed publisher 133. The update may be in the form of an extensible markup language (XML) feed. The received update includes an item identifier which uniquely identifies an item within the item catalog 124. The received update also includes metadata for the identified item. Examples of metadata attributes for a music media item include title, artist, release data, price, etc. Examples of metadata attributes for a video media item include title, release data, price, etc. If the item is digital media, one of the metadata attributes may be content. For example, metadata for a movie may include the movie itself as well as information about the movie.

In box 306, the update manager 121 accesses the lock data 127 to determine whether the received update will be applied to particular metadata attributes of the item. Where the lock used in the embodiment of FIG. 2 controls access to the item as a whole, the lock used in the embodiment of FIG. 3 controls access on a per-attribute level. That is, each item in the item catalog 124 has a set of possible metadata attributes, and individual attributes within the metadata can be locked against modification. In some embodiments, the lock for an item is associated with a bitmap, with one bit for each possible attribute of the item.

In this regard, in box 306 the update manager 121 looks for a lock which has the same item identifier as the received update. If no matching lock is found by the update manager 121 in box 306, then the item is not locked, and the update manager 121 moves to box 309. In box 309, the update manager 121 applies the update to the item catalog 124 using all the attributes contained in the received update. Having applied the update, the update manager 121 completes its process.

If in box 306 the update manager 121 does find a matching lock, the update manager 121 moves to box 312. In box 312 the update manager 121 begins an iteration loop to process the individual metadata attributes contained in the update. Starting with the first attribute in the update, the update manager 121 moves to box 315. In box 315, the update manager 121 parses the update to extract the current attribute. The update manager 121 retrieves attribute-specific information for the matching lock from the lock data 127 and compares the lock attributes with the current attribute. If the comparison in box 315 indicates that the current attribute is not locked, the update manager 121 moves to box 318. If in box 315 the update manager 121 determines that the current attribute is locked, the update manager 121 moves to box 321.

In box 318, having determined that the current attribute is not locked, the update manager 121 applies the update of the current attribute to the item catalog 124. The update manager 121 then continues the iteration loop at box 324 with the next attribute contained in the update.

In box 321, having determined that the current attribute is locked, the update manager 121 skips the update operation (box 318) and instead queues the update for the current attribute. A queued attribute update may be removed from the queue and applied at a future time, for example, when the attribute-specific lock is disabled, expired, removed, etc. The update manager 121 then moves to box 324 which sets up the iteration loop for the next attribute, which is then processed starting at box 315. When all attributes in the received update have been processed, the update manager 121 completes.

Some embodiments of process shown in FIG. 3 also notify one or more components when no update is performed due to a lock. The notification may be accomplished by a notification for each locked attribute, a notification for a group of locked attributes, a notification for the locked item, or other variations thereof. The notified components may include, for example, a third-party vendor, an internal system operator, etc. Various forms of notifications may be used, for example, an email message to one or more addresses, a simple messaging service (SMS) text message, and any other suitable form of notification.

Figure 4:
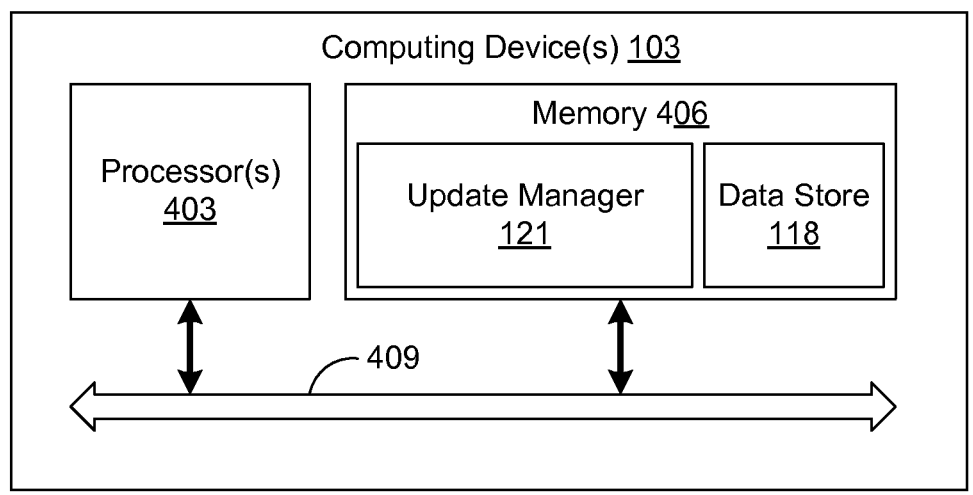
FIG. 4 is a schematic block diagram that provides one example illustration of a computing device employed in the networked environment of FIG. 1 according to various embodiments of the present disclosure.

Moving on to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is an update manager 121 and potentially other applications. Also stored in the memory 406 may be a data store 118 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 115 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the update manager 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 2 and FIG. 3 show the functionality and operation of an implementation of portions of the update manager 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIG. 2 and FIG. 3 show a specific order of execution, it is understood that the order of execution may differ from that which is depicted. For example, the order of execution of two or more blocks may be scrambled relative to the order shown. Also, two or more blocks shown in succession in the flowchart of FIG. 2 or FIG. 3 may be executed concurrently or with partial concurrence. Further, in some embodiments, one or more of the blocks shown in FIG. 2 or FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including update manager 121, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein the program, when executed by the computing device, causes the computing device to at least:
  receive an update from a feed for an item catalog, the update comprising an item identifier corresponding to an item and a plurality of item attributes corresponding to the item;
  access lock data;
  determine that an item lock in the lock data has a same item identifier as the update;
  parse the update to extract a first attribute of the plurality of item attributes;

retrieve attribute specific information for the item lock, the attribute specific information including a plurality of attribute specific locks;

determine that one of the plurality of attribute specific locks is associated with the first attribute by comparing the attribute specific information for the item lock with the first attribute;

place an attribute update for the first attribute in a queue without modifying the first attribute;

parse the update to extract a second attribute of the plurality of item attributes;

determine that none of the plurality of attribute specific locks are associated with the second attribute;

modify the second attribute of the plurality of item attributes according to the update from the feed;

remove at least one attribute update from the queue in response to an attribute specific lock being disabled, expired, or removed; and modify at least one attribute of the plurality of item attributes according to the at least one attribute update.

2. The computer-readable medium of claim 1, wherein the program further causes the computing device to at least create the item lock responsive to input from a system operator, the input being distinct from update metadata provided by the system operator.

3. The computer-readable medium of claim 1, wherein the lock data comprises a bitmap corresponding to the item, each bit in the bitmap individually corresponding to a respective item attribute of the plurality of item attributes.

4. The computer-readable medium of claim 1, wherein the program, when executed by the computing device, further causes the computing device to at least:

receive a second update from the feed for the item catalog, the second update comprising a second item identifier corresponding to a second item, and a plurality of second item attributes corresponding to the second item;

access the lock data;

determine that the lock data omits a second item lock associated with the second item identifier; and modify each of the plurality of item attributes corresponding to the item according to the update from the feed.

5. A system comprising:

an electronic data store configured to at least store specific computer-executable instructions, and a computing device in communication with the electronic data store and configured to execute the specific computer-executable instructions to at least:

receive an update from a feed for an item catalog, the update comprising an item identifier corresponding to an item and a plurality of item attributes corresponding to the item;

access lock data;

determine that an item lock in the lock data has a same item identifier as the update;

parse the update to extract a first attribute of the plurality of item attributes;

retrieve attribute specific information for the item lock, the attribute specific information including a plurality of attribute specific locks;

determine that one of the plurality of attribute specific locks is associated with the first attribute by comparing the attribute specific information for the item lock with the first attribute;

place an attribute update for the first attribute in a queue without modifying the first attribute;

parse the update to extract a second attribute of the plurality of item attributes;

determine that none of the plurality of attribute specific locks are associated with the second attribute;

modify the second attribute of the plurality of item attributes according to the update from the feed;

remove at least one attribute update from the queue in response to an attribute specific lock being disabled, expired, or removed; and modify at least one attribute of the plurality of item attributes according to the at least one attribute update.

6. The system of claim 5, wherein the computing device is further configured to execute the specific computer-executable instructions to at least:

receive a second update from the feed for the item catalog, the second update comprising a second item identifier corresponding to a second item, and a plurality of second item attributes corresponding to the second item;

access the lock data;

determine that the lock data omits a second item lock associated with the second item identifier; and modify the second item in the item catalog in accordance with update metadata from the second update.

7. The system of claim 5, wherein the computing device is further configured to execute the specific computer-executable instructions to at least:

determine that the update further comprises an item update for the item; and in response to determining that the item lock has the same item identifier as the update, place the item update for the item in the queue without modifying the item.

8. The system of claim 7, wherein the computing device is further configured to execute the specific computer-executable instructions to at least:

remove at least item update from the queue in response to an attribute specific lock being disabled, expired, or removed; and modify at least one item according to the at least one item update.

9. The system claim 5, wherein the lock data comprises a plurality of bitmaps individually corresponding to respective items in the item catalog.

10. The system of claim 5, wherein the update is expressed in extensive markup language (XML).

11. The system of claim 5, wherein the at least one update is modified in response to expiration of a timer or a change in a status of the lock.

12. The system of claim 5, wherein the computing device is further configured to execute the specific computer-executable instructions to at least enable the item lock responsive to a request from a system operator indicating the item should be locked.

13. A computer-implemented method comprising:

receiving an update from a feed for an item catalog, the update comprising an item identifier corresponding to an item and a plurality of item attributes corresponding to the item;

accessing lock data;

determining that an item lock in the lock data has a same item identifier as the update;

parsing the update to extract a first attribute of the plurality of item attributes;

retrieving attribute specific information for the item lock, the attribute specific information including a plurality of attribute specific locks;

determining that one of the plurality of attribute specific locks is associated with the first attribute by comparing the attribute specific information for the item lock with the first attribute;

placing an attribute update for the first attribute in a queue without modifying the first attribute;

parsing the update to extract a second attribute of the plurality of item attributes;

determining that none of the plurality of attribute specific locks are associated with the second attribute;

modifying the second attribute of the plurality of item attributes according to the update from the feed;

removing at least one attribute update from the queue in response to an attribute specific lock being disabled, expired, or removed; and modifying at least one attribute of the plurality of item attributes according to the at least one attribute update.

14. The computer-implemented method of claim 13, wherein the at least one update is modified in response to expiration of a timer or a change in a status of the lock.

15. The computer-implemented method of claim 13, further comprising reporting when the update from the feed was not applied to the item catalog.

16. The computer-implemented method of claim 13, wherein the item lock is associated with a time period defined by a system operator via a user interface and further comprising determining whether the item lock is enabled based least in part on the time period.

17. The computer-implemented method of claim 13, wherein the item lock is associated with a duration defined by a system operator via a user interface and further comprising determining whether the item lock is enabled based least in part on the duration.

18. The computer-implemented method of claim 13, wherein the update is expressed in extensive markup language (XML).

19. The computer-implemented method of claim 13, further comprising:
    enabling the item lock;
    associating the item lock with a timer; and
    disabling the item lock in response to an expiration of the timer.

20. The computer-implemented method of claim 13, wherein the item is a music media item and the plurality of item attributes corresponding to the item comprise at least one of title, artist, release date, or price.

* * * * *